US008346550B2

(12) United States Patent
Rose et al.

(10) Patent No.: US 8,346,550 B2
(45) Date of Patent: *Jan. 1, 2013

(54) SYSTEM AND METHOD FOR PROCESSING SPEECH RECOGNITION

(75) Inventors: Richard C. Rose, Florham Park, NJ (US); Sarangarajan Pathasarathy, Florham Park, NJ (US); Aaron Edward Rosenberg, Florham Park, NJ (US); Shrikanth Sambasivan Narayanan, Los Angeles, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/026,900

(22) Filed: Feb. 14, 2011

(65) Prior Publication Data

US 2011/0137651 A1    Jun. 9, 2011

Related U.S. Application Data

(63) Continuation of application No. 11/697,935, filed on Apr. 9, 2007, now Pat. No. 7,904,294, which is a continuation of application No. 09/966,081, filed on Oct. 1, 2001, now Pat. No. 7,219,058.

(60) Provisional application No. 60/240,243, filed on Oct. 13, 2000.

(51) Int. Cl.
*G10L 15/00* (2006.01)

(52) U.S. Cl. ......... 704/238; 704/231; 704/236; 704/270

(58) Field of Classification Search ........................ None
See application file for complete search history.

(56) References Cited

U.S. PATENT DOCUMENTS

| | | | |
|---|---|---|---|
| 5,712,957 A | | 1/1998 | Waibel et al. |
| 5,732,190 A | * | 3/1998 | Hamasaki et al. ............ 704/233 |
| 5,737,485 A | | 4/1998 | Flanagan et al. |
| 5,797,123 A | | 8/1998 | Chou et al. |
| 5,835,890 A | | 11/1998 | Matsui et al. |
| 5,848,389 A | | 12/1998 | Asano et al. |
| 5,855,000 A | | 12/1998 | Waibel et al. |
| 5,864,810 A | | 1/1999 | Digalakis et al. |
| 5,983,187 A | | 11/1999 | Haddock |
| 6,061,654 A | | 5/2000 | Brown et al. |
| 6,101,473 A | | 8/2000 | Scott et al. |
| 6,224,636 B1 | | 5/2001 | Wegmann et al. |
| 6,233,544 B1 | | 5/2001 | Alshawi |
| 6,233,557 B1 | | 5/2001 | Poppert |
| 6,243,679 B1 | | 6/2001 | Mohri et al. |
| 6,304,844 B1 | | 10/2001 | Pan et al. |
| 6,411,927 B1 | | 6/2002 | Morin et al. |
| 6,418,411 B1 | | 7/2002 | Gong |
| 6,510,415 B1 | * | 1/2003 | Talmor et al. ................. 704/273 |
| 6,581,033 B1 | | 6/2003 | Reynar et al. |
| 6,694,296 B1 | | 2/2004 | Alleva |
| 6,757,652 B1 | | 6/2004 | Lund et al. |
| 6,760,720 B1 | | 7/2004 | De Bellis |
| 7,280,961 B1 | * | 10/2007 | Bao .............................. 704/233 |
| 7,319,956 B2 | * | 1/2008 | Bossemeyer, Jr. ............ 704/243 |
| 2001/0031650 A1 | * | 10/2001 | Baiker et al. ................. 455/570 |
| 2002/0052742 A1 | | 5/2002 | Thrasher et al. |
| 2002/0055844 A1 | | 5/2002 | L'Esperance et al. |

* cited by examiner

*Primary Examiner* — Brian Albertalli

(57) ABSTRACT

An automatic speech recognition (ASR) system and method is provided for controlling the recognition of speech utterances generated by an end user operating a communications device. The ASR system and method can be used with a mobile device that is used in a communications network. The ASR system can be used for ASR of speech utterances input into a mobile device, to perform compensating techniques using at least one characteristic and for updating an ASR speech recognizer associated with the ASR system by determined and using a background noise value and a distortion value that is based on the features of the mobile device. The ASR system can be used to augment a limited data input capability of a mobile device, for example, caused by limited input devices physically located on the mobile device.

18 Claims, 9 Drawing Sheets

SYSTEM AND METHOD FOR PROCESSING SPEECH RECOGNITION

RELATED APPLICATIONS

This application is a continuation of U.S. patent application Ser. No. 11/697,935, filed Apr. 9, 2007, is a continuation of U.S. patent application Ser. No. 09/966,081, filed on Oct. 1, 2001, now U.S. Pat. No. 7,219,058, which claims the benefit of U.S. Provisional Application No. 60/240,243, filed Oct. 13, 2000, of which are incorporated herein by reference in their entirety.

BACKGROUND OF THE INVENTION

1. Field of Invention

This invention relates to speech recognition systems.

2. Description of Related Art

As the amount of information communicated within communication systems continues to increase, there is an increase in the use of communications devices. On mobile communications devices, space limitation is a significant problem as the size of the mobile devices that are manufactured continues to decrease. For example, the space on a small mobile device can limit the mobile device to having a limited resolution display, limited pen or mouse input modalities, a limited-sized keyboard and/or no keyboard at all. Each mobile communication device can have various modalities that allow an end user to input data into or operate the mobile device.

To solve this problem, input devices on a mobile device can be given multi-function capability. For example, multi-function keys are currently used to reduce the number of keys required on a mobile device. However, multi-function keyboards are difficult to use and tend to result in numerous errors during operation. For example, some systems used in web-enabled telephones attempt to predict complete words as the words are being entered using keys on the keyboard. However, these predictive text entry systems often completely mis-identify words and do not easily adapt to words in a different language. If no keyboard is used on the mobile device, a mouse or pen can be used. However, using the mouse or pen on a small mobile device to communicate a large amount of data can be awkward and inconvenient.

Moreover, with a limited number of input devices that correspond to various modalities of the mobile device, the implementation of a particular service, i.e., a word recognition service, can become more difficult. In order to increase word recognition capability, some mobile devices have included a larger keyboard. For example, some web-enabled telephones are equipped with a flip-up case that provides a larger touch sensitive screen for input functions. However, these screens are expensive and increase the likelihood of damage to the device due to the complexity of the screens. Furthermore, because these screens have increased power requirements, they prevent a reduction in the size of a portable battery used with the mobile device.

Although some mobile devices, such as personal digital assistants (PDA) include handwriting recognition software, the software suffers from inaccurate word recognition, and the user is required to write on the screen using a specialized set of characters or in a manner that is easily recognizable by the program.

In order to solve the above-mentioned problems, automatic speech recognition (ASR) systems have been used in mobile devices as an improved method of communicating information using the mobile device. However, the ASR systems for mobile devices must be able to adapt to various users, as well as the different characteristics associated with various devices. For example, each mobile device is likely to use a microphone having different response characteristics. Likewise, various background noise environments must be taken into consideration because mobile devices may move throughout a constantly changing background environment as the user transcends from one area to another.

Accordingly, there exists a need to improve the performance of ASR services by not making mandatory various complex or supervisory steps that the end user must perform to provide data to the ASR system service provider. Although end user input could always be used as part of the ASR system, by not making these steps mandatory, the efficiency and accuracy of the ASR system can be significantly improved.

SUMMARY OF THE INVENTION

The relatively small space limitations of a mobile device and the large databases required to implement a comprehensive ASR systems make it difficult to construct mobile devices including self contained ASR systems. Therefore, it is desirable to implement speech recognition using a network server, rather than using a system that is contained in the mobile device, to address problems associated with space limitations and a limited bandwidth within a mobile wireless environment.

Thus, an automatic speech recognition (ASR) system and method in accordance with this invention is provided for dynamically controlling the recognition of data generated by a communications device. The ASR system and method can be used with at least one communications device, such as a mobile device, or a personal computer that is used in a communications architecture, i.e., a client/server network.

The ASR system can be used for ASR of speech utterances input into a mobile device, to perform compensating techniques using at least one characteristic and to dynamically update an ASR speech recognizer associated with the ASR system. Thus, the ASR speech recognizer can be very flexible to tailor each speech recognition service. The ASR system can be used with mobile devices where users click on individual data fields on the mobile device for a database entry, then speak an entry for that field and subsequently see the recognized result displayed in the selected field as confirmation of its entry. The ASR system can be especially used to augment a limited data input capability of a mobile device, for example, caused by limited modalities or input devices physically located on the mobile device.

BRIEF DESCRIPTION OF THE DRAWINGS

This invention is described in detail with regard to the following figures, in which like elements are referred to with like numerals, and in which.

DETAILED DESCRIPTION OF PREFERRED EMBODIMENTS

Figure 1:
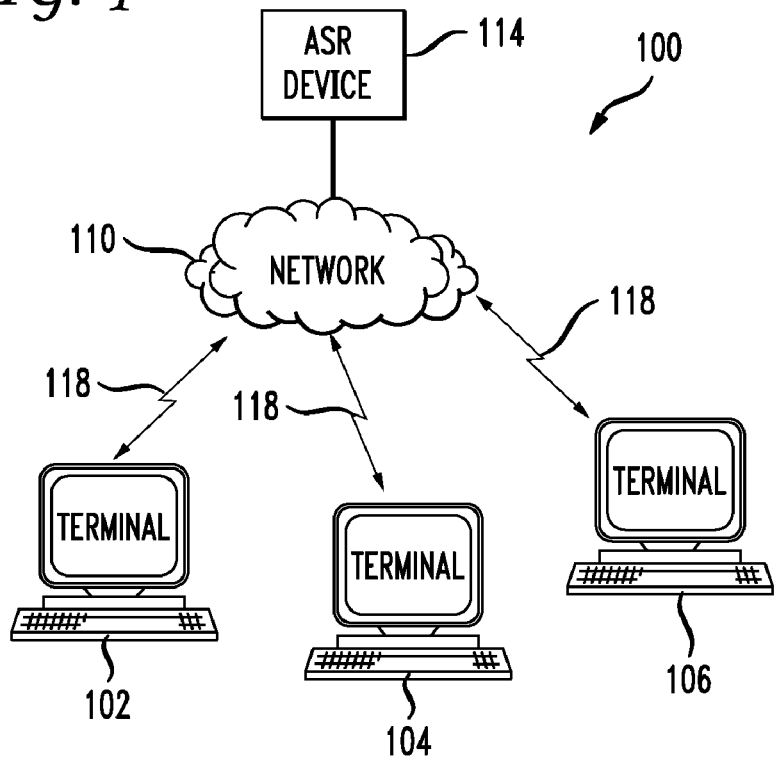
FIG. 1 is an exemplary block diagram of one type of communications system that can be used in an embodiment of an ASR system in accordance with this invention.

FIG. 1 shows an automatic speech recognition (ASR) system 100 that includes a network 110 and an ASR device 114 coupled to the network 110 via a communication link 116. A plurality of terminals 102, 108 and 110 are connected with the network 110 through communication links 118. The ASR device 114 is capable of receiving and storing, for example, a tailored profile of ASR characteristics specific to an end user. These ASR characteristics can then be used to assist the translation of a speech utterances and data entries using a speech recognition technique.

The terminals 102-106 may be devices of any type that allow for the transmission and/or reception of communication signals. For example, the terminals 102-106 may be LAN-line telephones, cellular telephones, computer, personal digital assistants (PDAs), video phones, video conference apparatus, smart or computer assisted televisions and the like. For the purposes of the following description of the present invention, it will be assumed that the terminals 102-106 are wireless PDAs.

The terminals are in communication with the network 110 through the communication links 118. These communication links 118 may be any type of connection that allows for the transmission of information. Some examples include conventional telephone lines, fiber optic lines, direct serial connection, cellular telephone connections, satellite communication links, radio frequency (RF) links, local area networks (LANs), intranet and the like. For the purposes of the following description of the present invention, it will be assumed that the communication links 118 are wireless links, such as RF links.

The network 110 may be a single network or a plurality of networks of the same or different types. For example, the network 110 may include a local telephone network in connection with a long distance telephone network. Further, the network 110 may be a data network or a telecommunications network or video distribution (e.g., cable, terrestrial broadcast or satellite) network in connection with a data network. Any combination of telecommunications, video/audio distribution and data networks, whether global, national, regional, wide-area, local area or in-home-network, may be used without departing from the spirit and scope of the present invention. For the purposes of discussion, it will be assumed that a network 101 is a single integrated voice, video and data network, that is either wired and/or wireless.

The ASR device 114 can communicate with the terminals 102-106 via the network 110 to receive information, such as speech utterances, from the terminals 102-106. The ASR device 114 can additionally store the tailored profile of an end user in a memory. The end user profile can include various features associated with an end user of the ASR system, such as billing preferences, network preferences, quality of service preferences and the like. The end user profile can also include data related to specific performance characteristics of various terminals 102-106, such as transducers associated with a terminal. Further, the end user profile can include noises of different background environments associated with the end user. The end user profile, such as the background noise data, can then be used to improve voice recognition techniques in order for an ASR system to better recognize a user's speech utterances.

For example, assume that an end user is using a mobile terminal with ASR capability on a busy city street. Further, assume that the end user was inputting speech utterances in order to navigate through a series of menus presented by the end user's service provider. Accordingly, as the speech utterances are spoken into the mobile terminal, the sounds of the busy city street are also received by the mobile terminal. The sounds can be received by an input of the mobile terminal, such as a microphone, and converted into a corresponding signal. The signal can also be affected by the specific performance characteristics of the terminal. The combined signal, including the speech utterances and background noises from the city street, is then transmitted to the service provider for ASR processing.

Once received by the service provider, the service provider can perform ASR by taking into account the background noise data of the end user's environment in addition to any known performance characteristics of the transmitting terminal. For example, the service provider can search for a stored series of background noises associated with the end user's background environment. Once the service provider determines a background noise (S) that matches the noise presented in the received signal, i.e., the end user's environment, the service provider can use the corresponding background noise data for use in a compensation technique when performing ASR. Furthermore, the service provider can take into account distortion associated with features of the end user's mobile terminal. For example, the service provider can determine performance characteristics, such as the type of transducer (or speaker) associated with the end user's mobile terminal, and compensate for distortion caused by a difference in the end user's transducer and a transducer used to train a speech recognition model. Accordingly, by using the known background noise data and transducer and/or speaker in conjunction with ASR technique, the service provider can more accurately interpret and implement an end user's speech utterances.

In addition to simply storing background noises corresponding to the end user's environment, the ASR device 114 can also store a probability that the background noise will occur. The probabilities can be based on a time of day, for instance, in the above example, the probability that a noise is a busy city street background noise, can be the highest during a user's lunch period, when the user is prone to walk along the city streets every week day. Accordingly, if the service provider receives speech utterances during this period of time, the probability that any speech utterances received from the mobile terminal will include busy city street background noise will be high. However, if the service provider receives speech utterances in the early morning or evening of a work day, while the end user is prone to be commuting to or from work, the probability of busy city street background noises may be small, while the probability of automotive background noises may be high. The automotive background noises can include any sound normally associated with driving an automobile, such as engine noise, radio, road noise and the like.

Figure 2:
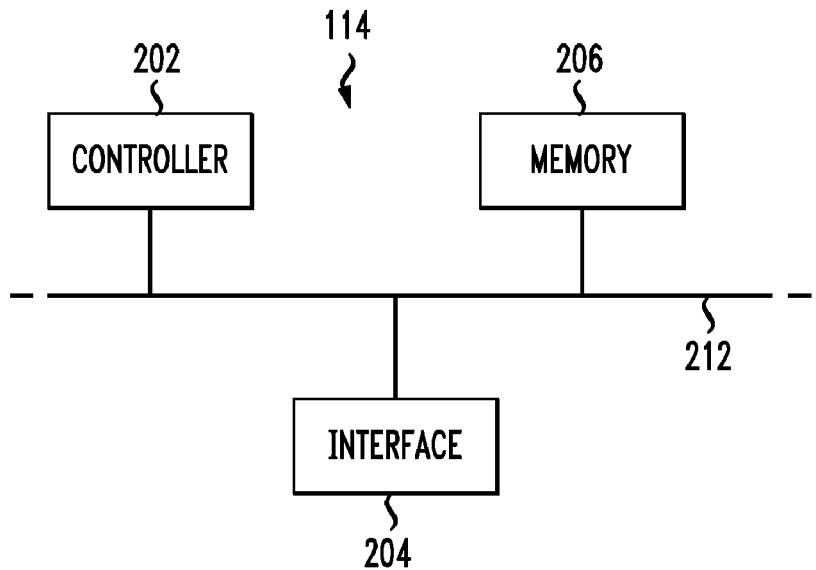
FIG. 2 is an exemplary block diagram of ASR system bus components that can be used in an embodiment of this invention.

FIG. 2 is an exemplary block diagram of an ASR device 114. The ASR device 114 can include a controller 202, a network interface 204 and a memory 206. The above components are coupled together via control/databus 212. It is to be appreciated that the architecture in FIG. 2 is exemplary only. Other architectures of the components may be used without departing from the spirit and scope of the present invention.

As provided above, when the end user is operating the mobile terminal with ASR capability on a busy city street inputting speech utterances, the combined signal is transmitted to the service provider that includes the ASR device 114.

Once received by the ASR device 114 via the network interface 204, the controller 202 can perform ASR by taking into account the background noise data of the end user's environment and the transducer used in the mobile terminal. For example, the controller 202 can search for a stored series of background noises in the memory 206 associated with the end user's background environment. Once the controller 202 locates a background noise (S) in the memory 206 that matches the noise presented in the received signal, the controller 202 can compensate a speech recognition model with the corresponding background noise data when performing ASR. Furthermore, the controller can locate in memory 206 performance characteristics, such as the type of transducer being used with the mobile terminal. Then the controller 202 can perform a more precise ASR by using the known background noise data and performance characteristics of the terminal.

Figure 3:
FIG. 3 is an exemplary data structure of ASR account information that can be stored in an embodiment of this invention.

FIG. 3 shows an exemplary data structure 300 for storing an end user's tailored profile information that corresponds to specific end users. It is to be appreciated that this data structure is exemplary only, and any combination of information specific to each end user can be used in the data structure without departing from the spirit and scope of the invention. In FIG. 3, the data structure 300 can include a field 302 that stores an ID corresponding to each of the end users. In this example, and for the purpose of simplicity, each end user in the data structure 300 has been consecutively labeled with a number beginning with the number 1.

The data structure can also include a field 303 that stores administrative information on each end user. For example, field 303 can store the end user's name, billing address, home telephone number, etc. Field 304 can store features specific to the end user's communications device, i.e., transducer on the end user's mobile terminal. The device features or performance characteristics can also include other information such as the make and model of the terminal and/or internal circuitry. For example, an identifying tag that corresponds to a specific make and model of the mobile terminal can be used so that the ASR system knows exactly what features are associated with the mobile device as soon as the end user logs on or dials up the service provider. The performance characteristics can also include any information about the terminal that can be used with any speech recognition technique to more accurately recognize a user's speech utterances.

Next, field 305 can be used to store an identifier, i.e., type 1 background, that represents the end user's common operating background environments like a cafeteria frequented by the end user, a conference room or a sports stadium environment. Field 306 can be used to store the time of day the end user frequently operates in the environments listed in field 305, and/or the current time so that the probability can be determined. Finally, field 307 can store the probability discussed earlier regarding the probability that the background noise will occur.

Figure 4:
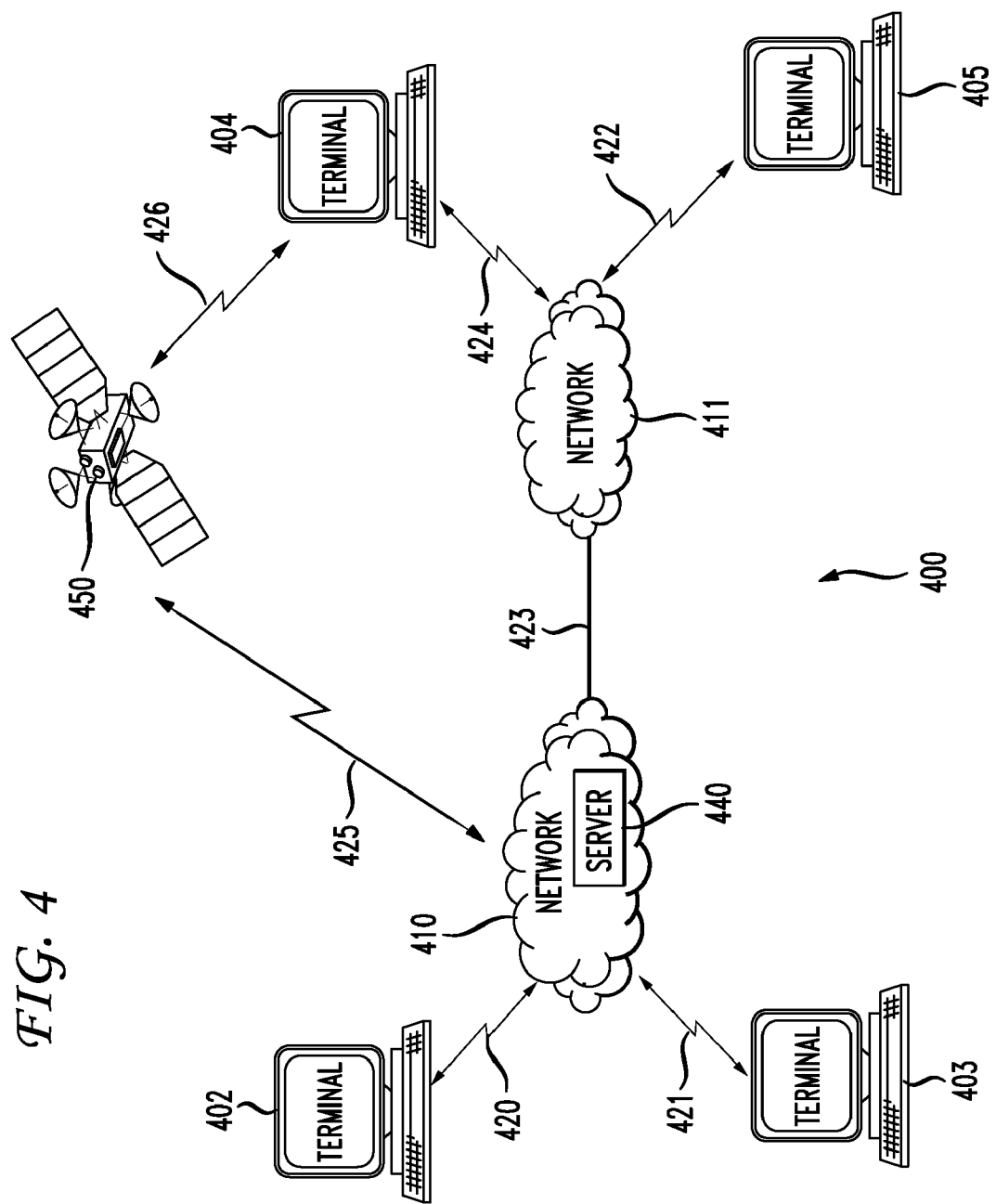
FIG. 4 is an detailed exemplary block diagram of a second type of communications system that can be used in an embodiment of the ASR system in accordance with this invention.

FIG. 4 is an detailed exemplary block diagram of a second type of communications system 400 that can be used in an embodiment of the ASR system in accordance with this invention. The system 400 can include one or more networks 410-411, terminals 402-405, servers 440 and satellite communications devices, such as one or more satellites represented by satellite 450. The terminals 402-405 may be any communications device capable of wired or wireless communication such as telephone stations, mobile devices, cell phones, personal digital assistants, hand-held devices, pagers, facsimile machines, computers, etc. For purposes of discussion, it will be assumed that the terminals 402-404 are mobile devices.

Communication signals transmitted by the terminals 402-404, for example, can be routed to respective destination addresses network components via the networks 410-411 and the satellite 440 if required.

The communication links 420-426 in the ASR system 400 may be any type of connection that allows for the transmission of information as discussed earlier. Here, it will be assumed that the communication links 120-126 are wireless links.

The networks 410-411 in the ASR system 400, as with FIG. 1, can be any combination of networks without departing from the spirit and scope of the invention. For the purposes of discussion, it will be assumed that the networks 410-411 are data networks.

The servers 440 can be any network-connected computer system that provides services to network users. The servers 440 can operate any known or later developed operating system such as Novell®, NetWare®, Windows®, Linux® or UNIX® operating system. Furthermore, the servers 440 can be centrally located or located in separate facilities, and the functions of the servers 440 can be performed by one server using a plurality of programs or a plurality of servers operating individually.

Figure 5:
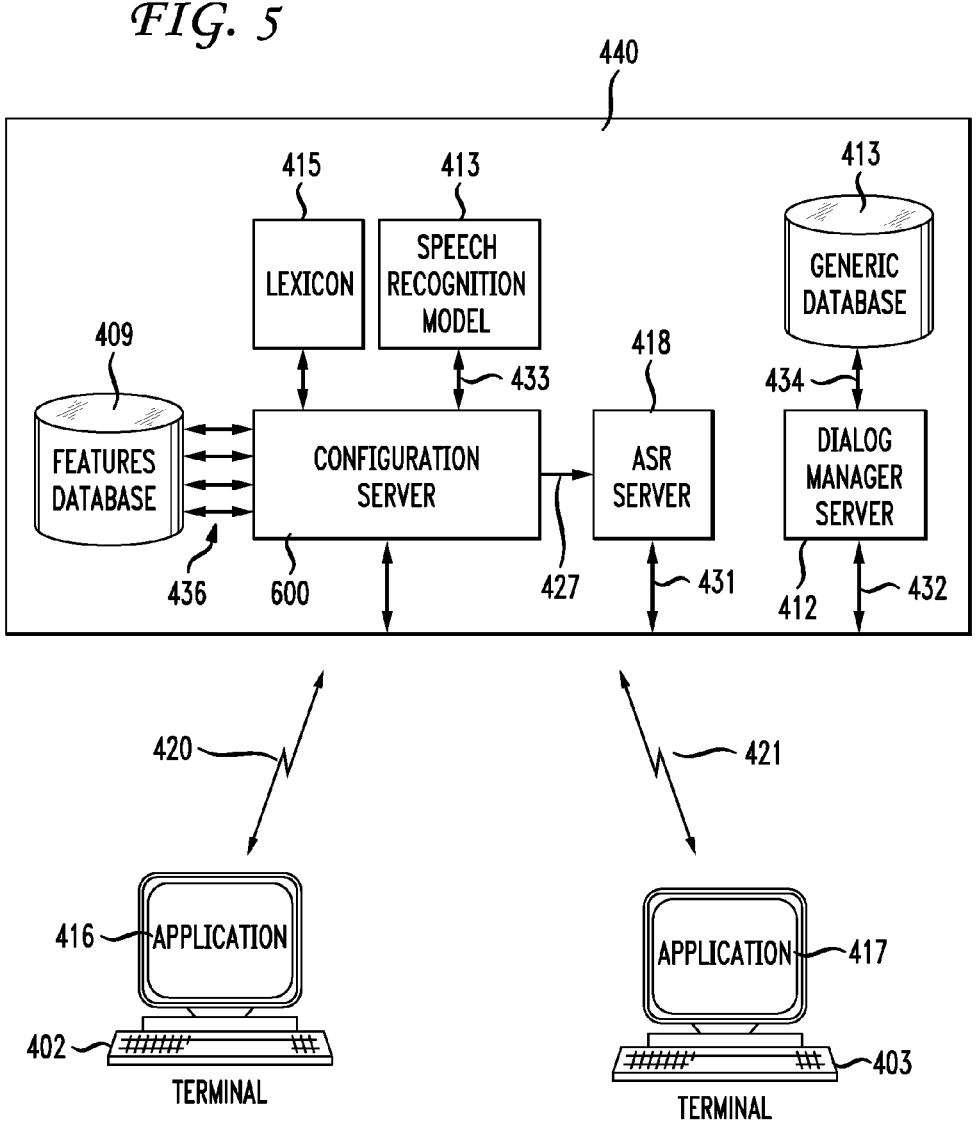
FIG. 5 is an exemplary block diagram of servers of the ASR system used in an embodiment of this invention.

FIG. 5 shows an exemplary block diagram of servers 440. As shown in FIG. 5, the servers 440 can include a configuration server 600, an ASR server 418 and a directory dialog server 412, and can function to receive the input speech data from the mobile device via circuits 420-422, interpret the data and determine a corresponding data field on the mobile device application for which the data will be entered. Additionally, the servers 440 can include a features database 409 that communicates with the configuration server 600 via circuits 436 and stores parameters associated with acoustic environment, speaker/transducer characteristics, pronunciation information and channel information. Moreover, the components of the ASR system can include a generic database 413, such as a dialog database, which is accessed by the dialog server 412 via circuit 434 and contains information such as, for example, data relating to the type of service being provided to the end user. The dialog server 412 takes a given string of tasks from, for example, the speech recognizer and interprets each string to determine what the end user is requesting or the type of data the end user wants. The dialog server 412 also can send the end user a request for more information to complete a certain task. It should be appreciated that the feature database 409 and the generic database 413 used with the servers 440 can be operated using any known or later know database software, and that it is not intended that the description of the information contained in the databases be limited to this discussion. Furthermore, dialog servers such as the dialog server 412 and its functions are well known to one skilled in the art.

The communications device within the ASR system can be a mobile device that includes a software application that performs feature analysis on the mobile device. The application in the mobile device can use a client/server protocol to interpret data that is generated on the mobile device and communicate the data to network-based servers. An ASR server and a directory dialog manager server can exist as communications servers within the ASR system along with a network-based configuration server.

The ASR server can receive speech data input into the mobile device by a user and interpret this data as data for a specific data field on the mobile device that the user has selected. The directory dialog manager server can subsequently receive the interpreted results from the mobile device and use the values of the selected data fields and a directory database to output dialog information to the mobile device.

The configuration server 600 can provide a mechanism for continual updating of acoustic parameters associated with components of the communication system architecture, i.e., performance characteristics, a speaker, mobile device and/or an acoustic environment. Moreover, the configuration server can receive acoustic features from the mobile device and can supervise the implementation of adaptation techniques from both the directory dialog manager and ASR servers. The configuration server can also store and continually update the ASR server. For example, if the ASR server is using an acoustic hidden Markov model (HMM) as an independent speech recognition model, the configuration server can continually update the HMM transformations for performing ASR within the system.

The configuration server 600 can perform feature transformations for feature analysis on the mobile device, acoustic environmental model compensation parameters for the independent speech recognition model and a pronunciation process for transforming a speaker independent lexicon. The configuration server 600 can also maintain a personal record of each mobile device along with specific information obtained from interrogating the mobile device.

By configuring the ASR system in this manner, ASR performance can be personalized for a specific end user. In other words, the implementation of the ASR server, dialog manager and configuration server as separate entities permits each mobile device to be specifically tailored to each user. For example, as provided earlier, a unique account for each subscriber can be assigned and controlled through the use of the ASR system. It should be appreciated that although this application uses a mobile communications system as an example, the ASR system may be applied to any communication system where a limited input capability exists on a communications device without departing from the spirit and scope of the present invention.

As an example of an operation of the ASR system 400, assume that an end user wishes to input data using terminal 402 that has a speech recognition capability in accordance with an embodiment of this invention. The end user can speak an utterance into the terminal 402 that is using an application that permits users to click on individual data fields for a database entry, speak the entry for that field and see the recognized result displayed in the selected field as confirmation. The data input into terminal 402 is then delivered through communication link 420 through the network 410 to the servers 440 via a client/server protocol application operating on the mobile device. For example, the mobile device can run a thin client operating system that implements a simple application that allows the terminal 402 to operate in a client/server environment. The thin client application can interpret input generated on the mobile device and communicate the input to the servers 440.

When the terminal 402 is initially operated in the ASR system, the configuration server 600 in ASR system can determine the identification of the terminal 402. Since most mobile devices are personal communication devices that are permanently assigned to a single end user, a mobile device identifier may be used to identify the specific terminal 402. However, for mobile devices such as a family shared web-enabled phone that may be used by several end users, a unique user code may be used to inform the ASR system of the current end user.

The configuration server 600 receives the terminal 402 identification information such as observation sequence, word string or supervisory information, and the voice-request from the end user using terminal 402 via communication link 420 and circuit 430. In response, the configuration server 600 retrieves via circuit 433 data to compensate a speech recognition model 414 such as HMM, or any other known or later developed model used for recognizing speech. The configuration server 600 the searches for compensation models that matches the information provided by the terminal 402 and end user. If the configuration server 600 locates a compensation model that is a match or is close enough to perform the speech recognition process satisfactory, then the configuration server 600 selects that compensation model. Otherwise, if no match is found, then the configuration server 600 can create a new compensation model that corresponds to information provided by the end user and terminal 402 which can include the background noise of the end user's current environment and a model of the noise introduced by the end user's current speaker/transducer in the terminal 402. The new background noise and speaker/transducer noise models are then saved in the features database 409 as estimations to be used in the compensating process. The background noise model and the speaker/transducer noise model are then applied to the speech recognition models in order to compensate for distortion and tailor the speech recognition for a particular end user. The configuration server 600 will be discussed in greater detail with reference to FIG. 6.

In various alternative embodiments according to this invention, speech utterances from different end users may be received from different environments like an office environment, home environment, vehicle environment or any other environment associated with the mobile device. Thus, the various environments need to be considered in the compensation process. For example, in a conference or seminar environment, different end users may be identified by radio frequency identification tags and/or smart microphones in the environment. The radio frequency tags identify each user and allow the ASR system to automatically apply appropriate background noise models and speaker/transducer noise models to each microphone even if the same speakers select different microphones or walk between different microphones.

The speech from the terminal 402 can be sent via communication link 420 and network 410 to the ASR server 418 either as coded ASR features using the client/server protocol or over a voice channel. Then the ASR server 418 can provide a result of the recognized speech interpretation back to terminal 402 either as a single string or word lattice. It should be appreciated that the ASR server 418 can be implemented with any known or later known speech recognizing software. Moreover, it will be apparent to one skilled in the art that any automatic speech recognition process capable of using speech recognition models along with the underlying speech to be recognized may be used in the practice of this invention.

Here, the automatic speech recognition system in accordance with an embodiment of this invention is performed using separate servers due to memory, power and processing constraints in conventional mobile devices. However, it will be apparent that ASR may also be provided within the communications device, i.e., a mobile device, without departing from the spirit and scope of the present invention.

After the terminal 402 receives the recognized speech information from the ASR server 418 via circuit 431 and communications link 420, the terminal 402 software application can subsequently send the dialog manager server 412 via communications link 420 and circuit 432 the new recognized speech information. The directory dialog manager server 412 can be operated using any known or later known dialog manager software. The recognized speech information can correspond to the values associated with the data fields that have been selected by the end user operating the terminal 402. The dialog manager server 412 can use the recognized speech information from the mobile device along with input from a generic database 413, for example, to display the recognized speech to the terminal 402, display directory information to the terminal 402 or to prompt the end user operating the terminal 402 for additional information. It should be appreciated that the type of data displayed to the terminals 402-405 can be any type of information related to ASR in general.

The mobile device software application 416-417 can be configured to instruct the configuration server 600 to update independent speech recognition models 414, such as HMMs, and update pronunciation models to reflect a specific type of terminal 402 being used and/or update an acoustic environment. Moreover, various acoustic parameters associated with a speaker, mobile device and/or acoustic environments can be updated though the use of the configuration server 600 and stored in the network 410. The stored acoustic parameters can then be used to compensate and apply the speech recognition models 414 associated with the ASR system. The mobile device software application 416-417 can also be configured to select a proper speech recognition network to associate with a given database field.

Figure 6:
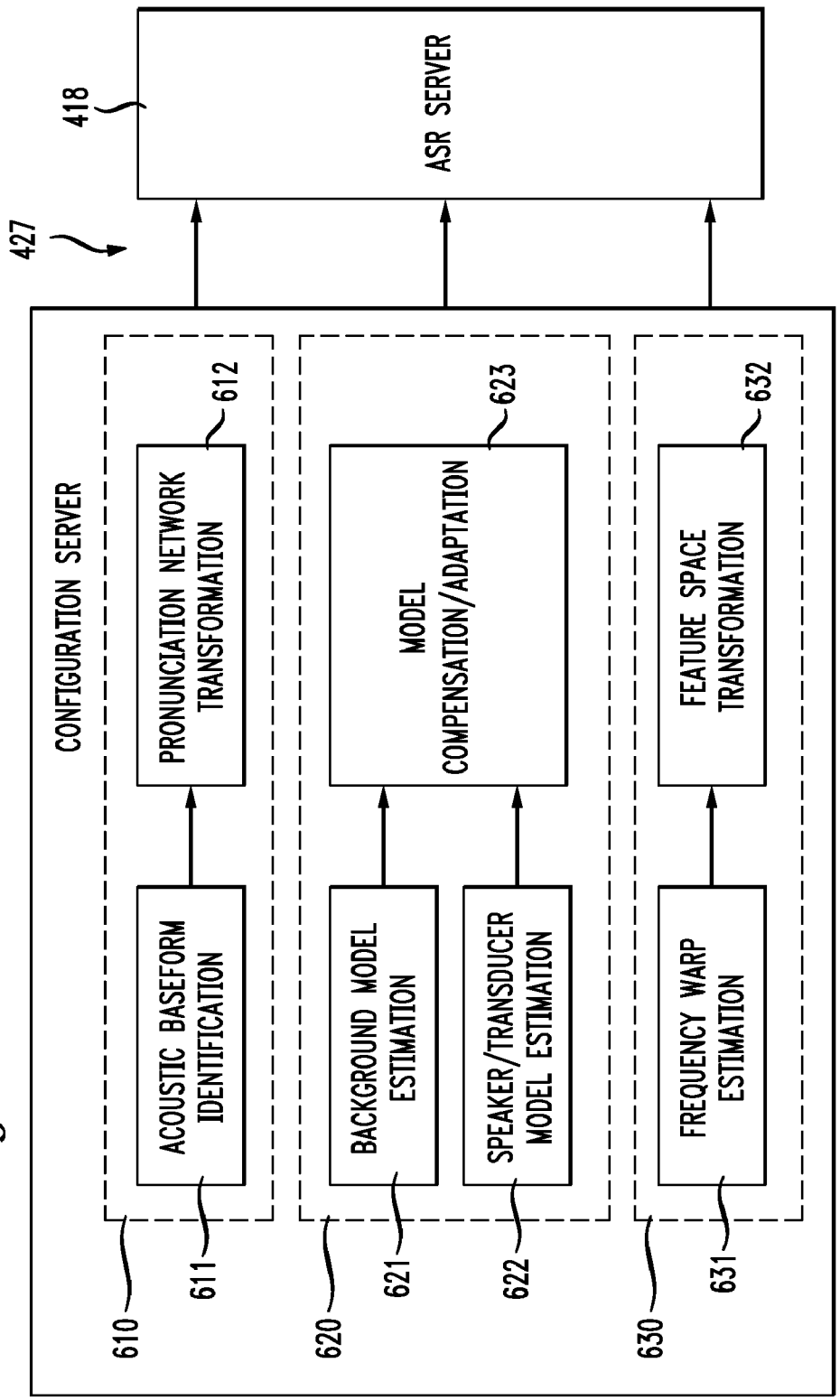
FIG. 6 is an exemplary block diagram of a configuration server of the ASR system used in an embodiment of this invention.

FIG. 6 shows an embodiment of the configuration server 600 that can be used with the ASR system in accordance with the invention. The configuration server 600 includes a pronunciation circuit 610, an environment-transducer-speaker circuit 620 and a feature space circuit 630.

The pronunciation circuit 610 can be, for example, a deterministic pronunciation lexicon that has one or several baseforms, i.e., linear strings of subword units, for each word in a vocabulary. A single baseform can be constructed on the basis of a joint decoding of multiple training tokens, thus ensuring larger robustness to pronunciation variation. The pronunciation circuit 610 can also properly represent natural pronunciation variations combined with accurate speech recognition by allowing multiple baseforms for each word.

To perform these functions, the pronunciation circuit 610 receives feature information, i.e., speaker/transducer feature information from the feature database 409, and data from the speech recognition model 414, i.e., HMM. The pronunciation circuit 610 can include an acoustic baseform identification circuit 611 and a pronunciation network transformation circuit 612. The acoustic baseform identification circuit 611 can construct the single or multiple baseforms for each word. Furthermore, the acoustic baseform identification circuit 611 can also represent words by a different number of baseforms. The pronunciation network transformation circuit 612 analyzes the baseforms from the acoustic baseform identification circuit 611 and selects various baseforms to create a lexicon that fulfills predetermined requirements. The resulting lexicon data is communicated to the ASR server 418.

The environment-transducer-speaker circuit 620 can function to compensate the independent speech recognition models 414 for background noise and the type of speaker/transducer being used by the end users. The environment-transducer-speaker circuit 620 includes a background model estimation circuit 621, a speaker/transducer model estimation circuit 622 and a model compensation adaptation circuit 623. The background model estimation circuit 621 determines a model of acoustic background noise based on noise input N and inputs the model into the model compensation adaptation circuit 622. The speaker/transducer model estimation circuit 622 determines a difference between an end user's actual transducer used in the mobile device (or microphone characteristic) and the response characteristics of the transducer/microphone used to train the speech recognition models 414. The determination is input as a linear model transform into the model compensation adaptation circuit 623.

The model compensation adaptation circuit 623 receives input from both the background model estimation circuit 621 and the speaker/transducer model estimation circuit 622 and compensates, or adapts, the speech recognition models 414 for both the acoustic background noise representing a specific environment, and speaker/transducer differentiation. The compensated output is subsequently communicated to the ASR server 418.

The configuration server 600 is the focal point in the ASR system that allows an end user to transparently "train" the ASR system with little steps to tailor a speech recognition technique to that specific end user and mobile device. In order to accomplish this function, utterances, background information and the features associated with the end user and mobile device are input into the ASR system as part of the training process. Then, the ASR system is activated for that particular end user and attempts to find stored speech recognition information that best matches the utterances, background information and/or features of the mobile device associated with the end user. If the ASR system is unable to find the best match of information, then the ASR system can store the input information as new information in order to create a new speech recognition model tailored for that end user and the mobile device. This new speech recognition model will now be used during the speech transformation process every time the end user logs on to the ASR system. Moreover, the training method can be performed in a supervisory mode where the ASR system uses various side information provided by the end user to help train the speech recognition model, or the training method can be performed in an unsupervisory mode where the end user provides no side information to assist in training the speech recognition model. It should be appreciated that the techniques for "training" a speech recognizer are well known to one skilled in the art. Accordingly, for purposes of convenience, a only a general description of this training process is discussed.

In order to perform a warping procedure, the configuration server 600 uses the feature space circuit 630 that includes a frequency warp estimation circuit 631 and a feature space transformation circuit 632. The feature space circuit 630 compensates for a variability that exists in vocal tract shape among speakers or end users in a certain population. This variability can result in a significant degradation from speaker dependent to speaker independent speech recognition performance. Thus, the feature space circuit 630 "normalizes" parametric representations of an input speech signal for the purpose of reducing the effects of differences between speakers.

The frequency warp estimation circuit 631 models the distortions caused by vocal tract shape differences by a linear warping in the frequency domain of the input speech signal. An example of the warping factor estimation process to form the model is described as follows using an HMM.

In general, the process warps the frequency scale of the utterances for each speaker in the training set consistently, so that the resulting speaker-independent HMM will be defined over a frequency normalized feature set. As shown in equation 1, the warping factor estimation process requires a pre-existing speech model.

$$\hat{\alpha}_i = \underset{\alpha}{\operatorname{argmax}} Pr(X_i^\alpha \mid \lambda_i W_i) \quad (1)$$

In equation (1), X is the speech utterances and W is recognized word strings used in the transformation process. An iterative procedure is used to alternately choose the best warping factor for each speaker, and then build a model using the warped training utterances. The process can collect speech and recognized word strings to continuously update the HMM model and can use the side information discussed earlier to determine whether to use the information to update the HMM model. Moreover, a probability value can be incorporated into the process which helps analyze user responses for a particular application to determine a probability that the speech and word strings will work well to update the HMM model. If the probability value indicates that the update information will not satisfactory update the HMM model, then it can be discarded.

The feature space transformation circuit 632 then uses the model formed by the frequency warp estimation circuit 631 to input to the ASR server 418 a compensation value, i.e., normalized feature value, for the differences in the vocal tract shapes.

Thus, the configuration server 600 operates along with the ASR server 418 and dialog manager server 412 to compensate the speech recognition models 414.

The ASR system described above can perform parallel model combination (PMC) and maximum likelihood (ML) regression based transducer compensation. Here, it can be assumed that statistics gathered from previous utterances can be applied to updating models of the environment, the speaker, and the transducer.

In PMC, it can be assumed that the HMM parameters for clean speech and the acoustic background environment are known. Specifically, the speech model cepstrum domain mean and covariances vectors have components that are represented by $\mu_i$ and $\Sigma_{i,j}$, in the speech model $\lambda_s$, and the background model cepstrum means and covariance have vector components that are represented by, $\mu_i(nse)$ and $\Sigma_{i,j}(nse)$ for a single density background model λnse. It is assumed that speech and background are additive in the linear spectral domain. So the linear spectrum domain means and variances, $\mu_i^{lin}$ and $\Sigma_{i,j}^{lin}$, can be obtained using equation (2) where $\hat{\mu}_i^{lin}$ and $\hat{\Sigma}_{i,j}^{lin}$, are obtained by the sum $$\hat{\mu}_i^{lin} = W\mu_i^{lin} + \mu_i^{lin}(nse)$$

$$\hat{\Sigma}_i^{lin} = W\Sigma_{i,j}^{lin} + \Sigma_{i,j}^{lin}(nse) \quad (2)$$

wherein W is an environment dependent scale factor. By approximating the sum of log normal densities to be log normal, the compensated parameters can be mapped back into the cepstrum domain.

As shown in equation (3), in performing the noise and speaker/transducer compensation, a relatively simple model of noise corruption is assumed where speech signal, S, is corrupted by additive noise, N, and both are received by a linear transducer whose characteristics, W, must be estimated from the corrupted speech, X:

$$X = W(S+N) \quad (3)$$

A model for the filtered noise $\lambda_{WN}$ is estimated from those regions of the test utterance where no speech is present. It is also necessary to estimate W from the corrupted speech and then compensate the speaker independent clean speech model, $\lambda_s$, for the effects of both W and N.

The following procedure is used to simultaneously compensate the speech model for transducer and environmental distortions. This is implemented as an iterative procedure where for iteration i, a corrupted speech model, $\hat{\lambda}_x^{(i)}$, is obtained from the estimated transducer distortion $\hat{W}^{(i)}$ and the corrupted speech model from the previous iteration, $\hat{\lambda}_x^{(i-1)}$. Each iteration consists of two steps. In a first step, a ML estimate of transducer distortion is obtained using equation (4):

$$\hat{W}^{(i)} = \max_w P(X \mid \lambda_x^{(i-1)}, W) \text{ where } \lambda_x^{(0)} = \lambda_s \quad (4)$$

In a second step, the clean speech HMM, $\lambda_s$, is compensated with respect to the transducer distortion, and the Gaussian mean vectors of the resulting model are compensated for environmental distortion. Since a convolutional distortion in the linear domain is equivalent to an additive bias in the cepstrum domain, compensating $\hat{\lambda}_s^{(i)}$ for transducer distortion is performed in equation (5) as:

$$\hat{\lambda}^{(i)}(k,l) = \hat{\mu}^{(i)}(k,l) + \hat{w}^{(i)}. \quad (5)$$

In Equation 5, $\hat{\mu}^{(i)}(k,l)$ is the cepstrum mean vector for state k and mixture l in model $\hat{\lambda}x^{(i)}$ and $\hat{w}^{(i)}$ is the cepstrum transducer bias vector estimated in the first step of the above procedure.

Since the two step procedure requires initial estimates of the corrupted speech model, there is a potential to further improve parameter estimates by iterating the process.

Figure 7:
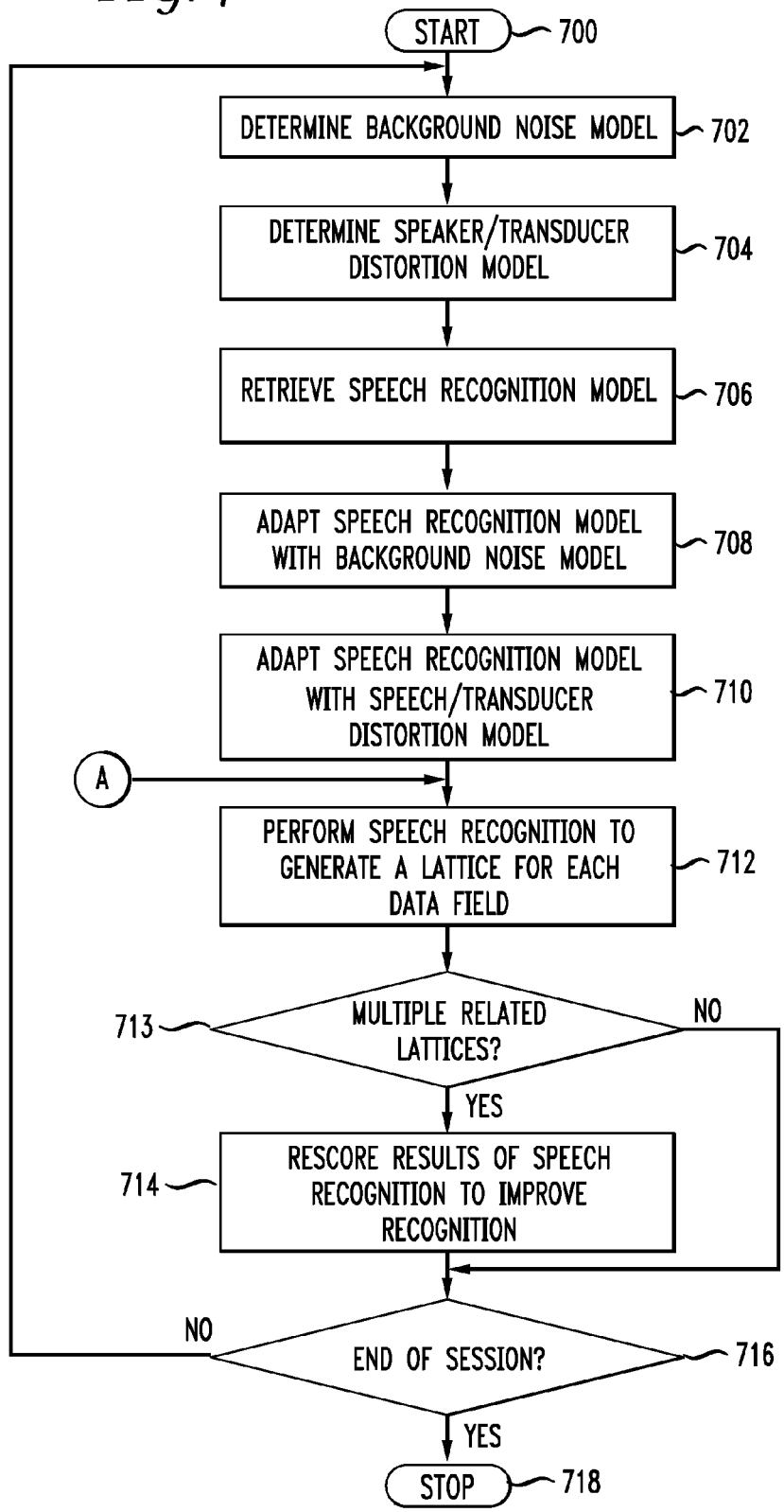
FIG. 7 is an exemplary flowchart of an ASR process used in an embodiment of this invention.

FIG. 7 shows a flowchart describing an exemplary process for performing ASR by compensating a speech recognition model in accordance with an embodiment of the ASR system of the present invention. It should be appreciated that this process can be performed continuously using any predetermined interval in order to continuously update the speech recognition model. The process begins in step 700 and proceeds to 702 where operation determines a background noise model. The process for determining the background noise model will be described in greater detail below with reference to FIG. 8. Operation then proceeds to step 704.

In step 704, operation determines a speaker/transducer distortion model. Operation for determining the speaker/transducer distortion model will be described in greater detail below with reference to FIG. 9. Operation then proceeds to step 706.

In step 706, operation retrieves at least one speech recognition model, which can be an independent speech recognition model. Then, in step 708, operation adapts or compensates the speech recognition model with the background noise model. Subsequently, in step 710, operation adapts or compensates the retrieved speech recognition model from step 706 with the speaker/transducer distortion model. Operation then proceeds to step 712.

In step 712, operation performs automatic speech recognition using the compensated speech recognition model. The speech recognition process results in the generation of a recognized single string or multiple word lattices for each utterance. Because vocabularies involved in ASR can be very large, and statistical language models may not apply, the tasks of performing speech recognition can result in high language model perplexity which can cause high word error rates. Thus, a rescoring process can be applied and will be discussed in greater detail below. However, it should be appreciated that ASR techniques using speech recognition models are well known in the art, and are therefore not described in great detail in this disclosure.

In step 713, it is determined whether the speech recognition process generated multiple word lattices that have inter-relationships existing between each other. If so, the operation proceeds to step 714. Otherwise, operation jumps to step 716.

Next, in step 714, operation performs a lattice rescoring process on the results of the speech recognition in order to significantly improve the accuracy of the ASR process in accordance with an embodiment of this invention. The lattice rescoring process will be described in greater detail below with respect to FIG. 10.

Next, in step 716, operation determines whether to run the operation again. If so, then operation returns to step 702. Otherwise, operation proceeds to step 718 where operation stops.

Figure 8:
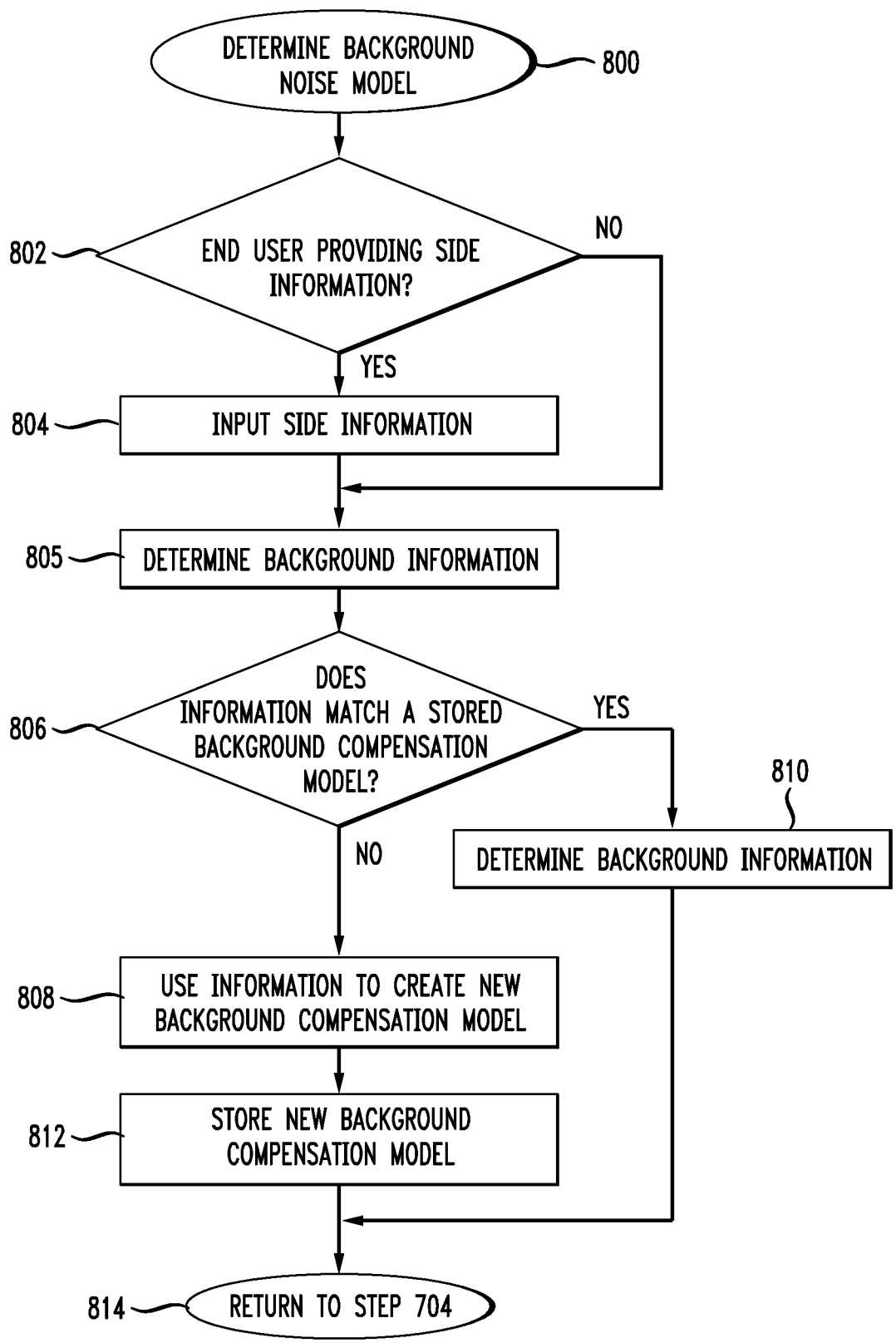
FIG. 8 is an exemplary detailed flowchart of an ASR process for determining a background noise model in an embodiment of this invention.

FIG. 8 is a exemplary flowchart of a more detailed process for determining a background noise model in an embodiment of this invention. After beginning in step 800, operation proceeds to step 802 where it is determined whether the end user desires to input side information as discussed earlier. If so, the operation proceeds to step 804 where the user side information is input. Otherwise, operations jumps to step 805. In step 805 background information is input that corresponds to the end user's environment. Next, in step 806, it is determined whether the information provided matches a stored background compensation model. If so, then operation proceeds to step 808. Otherwise, operation proceeds to step 810 where the matched compensation model is selected from memory. Then operation proceeds to step 808.

In step 808, the background information provided in step 805 (and/or any side information) is used to create a new compensation model. Then, in step 812, the new background compensation model is stored in memory. Operation then proceeds back to step 704.

Figure 9:
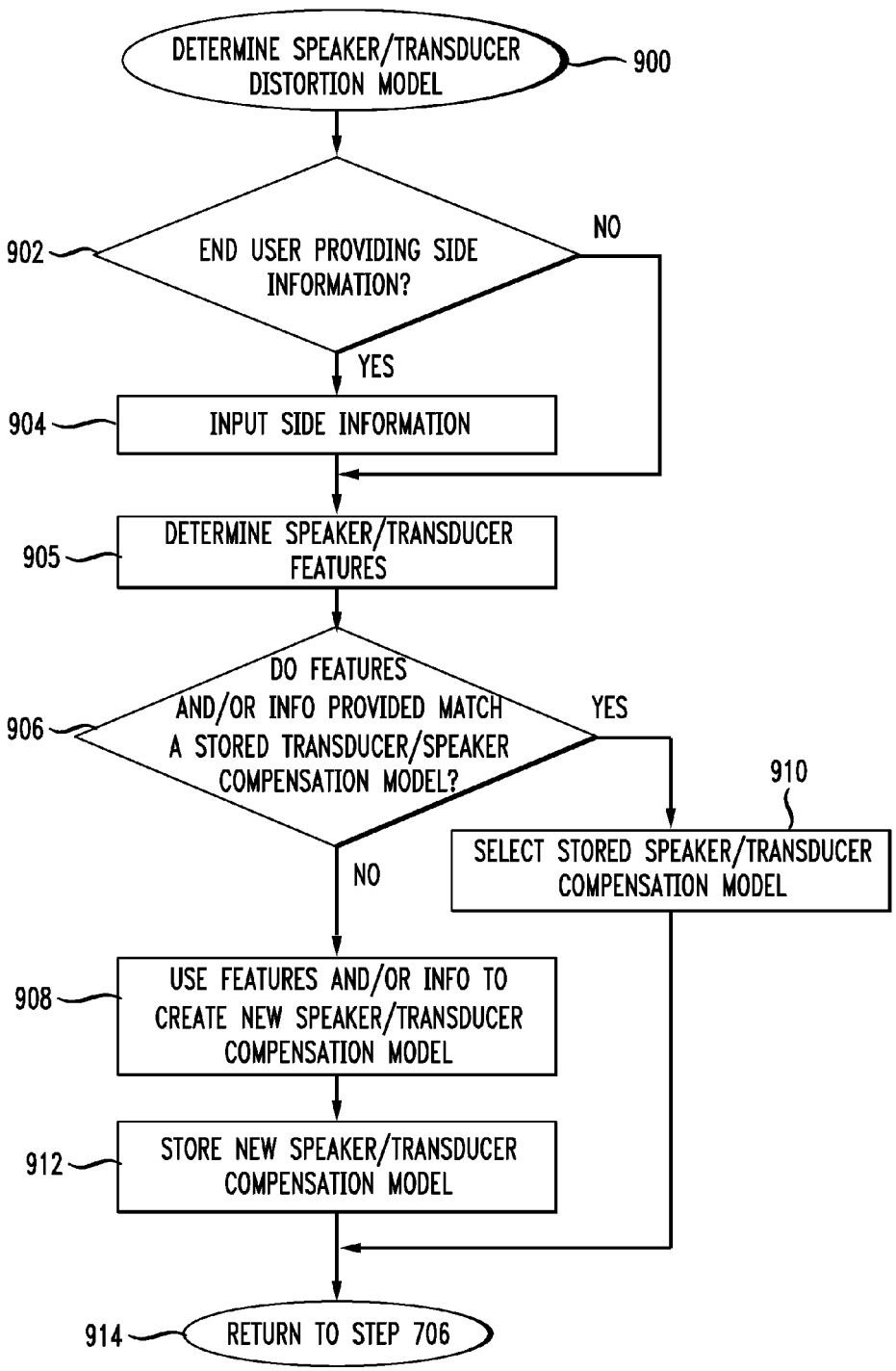
FIG. 9 is an exemplary detailed flowchart of an ASR process for determining a speaker/transducer distortion model in an embodiment of this invention.

FIG. 9 shows an exemplary flowchart of a more detailed process for determining a speaker/transducer distortion model in accordance with an embodiment of this invention. After beginning is step 900, operation determines in step 902 whether the user desires to input any side information. If so, then operation proceeds to step 904 where the side information is input. Otherwise, operation jumps to step 905. In step 905, the system determines the features of the transducer/speaker of the mobile device or terminal. Then operation proceeds to step 906.

In step 906, it is determined whether the features of the transducer/speaker (and/or any side information) match a stored transducer/speaker compensation model. If not, then operation proceeds to step 908, where the features of the transducer/speaker (and/or any side information) is used to create a new speaker/transducer compensation model. Then, in step 912, the new speaker/transducer compensation model is stored. Operation then proceeds to step 814. However, if there is a stored speaker/transducer compensation model that matches the features and/or input information in step 906, then operation proceeds to step 910 where the matched stored speaker/transducer model is selected. Operation then returns to step 706.

In the exemplary embodiments of the speech recognition process in accordance with this invention, as previously discussed, the ASR system can be used by an end user to enter data into data fields and perform directory retrieval if information by speaking into a communications device. When the ASR system recognizes the data in individual data fields, situations may occur where similar data may be difficult to distinguish. Thus, a rescoring process can be performed where the results, i.e., generated lattices, of the speech recognition process are analyzed to determined whether a relationship exists between multiple lattices. In some instances, it can be predetermined whether dependencies exist between particular lattices and whether the original choice or word from memory was the correct choice. By combining the constraints available for each utterance or lattice, speech recognition can be significantly improved. It should be appreciated by one skilled in the art that language models used in the rescoring process in accordance with one exemplary embodiment of this invention describe inter-relationships or constraints that exist between each lattice and are well known in the art. Moreover, the rescoring process can be performed transparent to the user.

Figure 10:
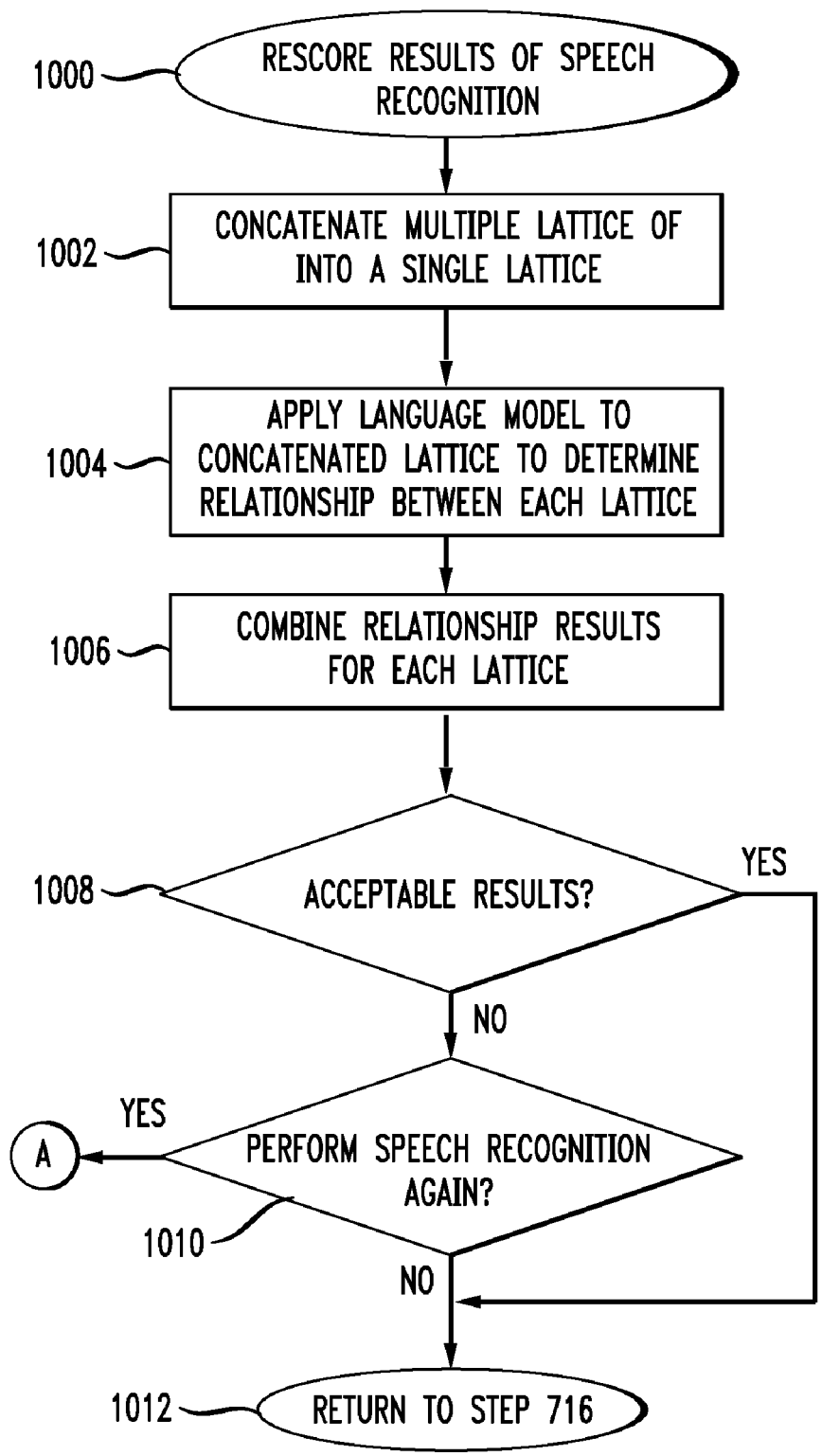
FIG. 10 is an exemplary detailed flowchart of an ASR rescoring process used in an embodiment of this invention.

FIG. 10 shows an exemplary flowchart of a more detailed process for rescoring the speech recognition results in accordance with an embodiment of this invention. After it has been determined to rescore the results of the speech recognition process, operation begins in step 1000. Next, in step 1002, each generated multiple lattice is concatenated into a single lattice. Then, in step 1004, a language model is applied to the concatenated single lattice to determine a relationship, or multiple relationships, between each lattice. Then, operation proceeds to step 1006.

In step 1006, the results of the relationships between the multiple lattices are combined and represent a relationship between every data field and corresponding lattice. Next, in step 1008, it is determined whether the results are acceptable. For example, a confidence score based on predetermined values could be used to assist the system in determining whether the solutions are acceptable if the confidence value was compared to predetermined acceptance criteria. If so, then operations jumps to step 1012. Otherwise, operations proceeds to step 1010 where it is determined whether the process should be performed over again by entering new data into the data fields. If so, the operation returns to step 702. Otherwise, operation returns to step 716.

In the illustrated embodiments of this invention, the controller is implemented with a general purpose processor. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed. A tangible computer-readable medium, such as a hard drive, RAM, ROM, and the like, can store instructions for controlling the processor in a device or system to perform any of the steps disclosed herein. Tangible computer-readable media exclude signals per se, energy and wireless connections.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A method of performing speech recognition, the method comprising:
    receiving a speech utterance, spoken by a user, at a service provider from a client device;
    identifying a time associated with the speech utterance;
    determining a probability associated with the user and the time, the probability being an expected type of background noise for the user at the time; and
    based on the probability, applying a background noise model to recognize the speech utterance.

2. The method of claim 1, wherein the client device is a mobile device.

3. The method of claim 1, wherein determining the probability is based on accessing a stored series of background noises from a user's background environment.

4. The method of claim 1, wherein applying the background noise model comprises compensating a speech recognition model with the background noise model.

5. The method of claim 1, wherein determining the probability comprises accessing a profile of the user.

6. The method of claim 1, wherein applying the background speech model is performed based on characteristics of the client device.

7. A non-transitory computer-readable storage medium storing instructions for controlling a computing device to perform speech recognition, the instructions comprising:
    receiving a speech utterance, spoken by a user, at a service provider from a client device;
    identifying a time associated with the speech utterance;
    determining a probability associated with the user and the time, the probability being an expected type of background noise for the user at the time; and
    based on the probability, applying a background noise model to recognize the speech utterance.

8. The non-transitory computer-readable storage medium of claim 7, wherein the client device is a mobile device.

9. The non-transitory computer-readable storage medium of claim 7, wherein determining the probability is based on accessing a stored series of background noises from a user's background environment.

10. The non-transitory computer-readable storage medium of claim 7, wherein applying the background noise model comprises compensating a speech recognition model with the background noise model.

11. The non-transitory computer-readable storage medium of claim 7, wherein determining the probability comprises accessing a profile of the user.

12. The non-transitory computer-readable storage medium of claim 7, wherein applying the background speech model is performed based on characteristics of the client device.

13. A system for performing speech recognition, the system comprising:
    a processor;
    a first module configured to control a processor to receive a speech utterance, spoken by a user, at the system from a client device, wherein the client device is remote from the system;
    a second module configured to control a processor to identify a time associated with the speech utterance;
    a third module configured to control a processor to determine a probability associated with the user and the time, the probability being an expected type of background noise for the user at the time; and
    a fourth module configured to control a processor, based on the probability, to apply a background noise model to recognize the speech utterance.

14. The system of claim 13, wherein the client device is a mobile device.

15. The system of claim 13, wherein the third module is further configured to determine the probability based on accessing a stored series of background noises from the user's background environment.

16. The system of claim 13, wherein the fourth module further applies the background noise model by compensating a speech recognition model with the background noise model.

17. The system of claim 13, wherein the third module further determines the probability by accessing a profile of the user.

18. The system of claim 13, wherein the fourth module further applies the background noise model is performed based on characteristics of the client device.

* * * * *